United States Patent [19]

Möckel et al.

[11] Patent Number: 4,940,469
[45] Date of Patent: Jul. 10, 1990

[54] LOW-FOAMING COMPOSITION FOR FINISHING SYNTHETIC FIBRES: DYE OR OPTICAL BRIGHTENER OR ULTRA-VIOLET ABSORBER AND ALKYLENE-DIAMIDE:ETHYLENE-DIS-TEARAMIDE

[75] Inventors: Reinhart Möckel, Schopfheim-Eichen, Fed. Rep. of Germany; Roland Putzar, Hofstetten, Switzerland

[73] Assignee: Ciba-Geigy Corporation, Ardsley, N.Y.

[21] Appl. No.: 303,433

[22] Filed: Jan. 30, 1989

[30] Foreign Application Priority Data

Feb. 8, 1988 [CH] Switzerland .......................... 439/88
Nov. 25, 1988 [CH] Switzerland ......................... 4385/88

[51] Int. Cl.$^5$ ..................... C09B 67/42; D06L 3/12; D06M 13/34; D06P 1/64
[52] U.S. Cl. .................................. 8/527; 8/586; 8/602; 8/610; 8/616; 8/648; 8/688; 8/690; 8/692; 8/922; 8/524
[58] Field of Search ................. 8/527, 586, 589, 648

[56] References Cited

U.S. PATENT DOCUMENTS

| | | | |
|---|---|---|---|
| 3,231,508 | 1/1968 | Lew | 252/152 |
| 3,977,828 | 8/1976 | Becker et al. | 8/529 |
| 4,094,634 | 6/1978 | Becker et al. | 8/558 |
| 4,202,838 | 5/1980 | Lauton et al. | 8/589 |
| 4,402,702 | 9/1983 | Kasper et al. | 8/524 |
| 4,767,568 | 8/1988 | Abel et al. | 252/321 |

FOREIGN PATENT DOCUMENTS 638239  9/1983  Switzerland .

OTHER PUBLICATIONS

H. Gold in Venkataraman's, "The Chemistry of Synthetic Dyes", vol. V, (Academic Press), 1971, p. 536.
Journal of Applied Polymer Science, vol. 33 (1987), pp. 2087–2095.

*Primary Examiner*—A. Lionel Clingman
*Attorney, Agent, or Firm*—George R. Dohmann

[57] ABSTRACT

A stable and low-foaming composition for finishing synthetic fibres which contains, based on (a)+(b)+(c)
(a) 15 to 84% by weight of a sparingly water-soluble or water-insoluble dye, fluorescent whitening agent or UV absorber,
(b) 15.5% to 75% by weight of one or more dispersing agents, and
(c) 0.5 to 10% by weight of an alkylenediamide.

15 Claims, No Drawings

LOW-FOAMING COMPOSITION FOR FINISHING SYNTHETIC FIBRES: DYE OR OPTICAL BRIGHTENER OR ULTRA-VIOLET ABSORBER AND ALKYLENE-DIAMIDE:ETHYLENE-DISTEARAMIDE

The present invention relates to a low-foaming composition for finishing synthetic fibres, in particular a low-foaming composition of a disperse dye.

The composition of this invention comprises, based on (a)+(b)+(c), (a) 15 to 84% by weight of a sparingly water-soluble or water-insoluble dye, fluorescent whitening agent or UV absorber, (b) 15.5% to 75% by weight of one or more dispersing agents, and (c) 0.5 to 10% by weight of an alkylenediamide.

The composition preferably comprises 18 to 59% by weight of component (a), 40 to 75% by weight of component (b), and 1 to 7% by weight of component (c).

Dyes that may suitably be used are organic or inorganic pigments, vat dyes or, preferably, disperse dyes, as well as other insoluble or sparingly soluble dyes.

Water-insoluble or sparingly water-soluble fluorescent whitening agents are compounds or mixtures of compounds selected, for example, from the class of the stilbenes, distyrylbenzenes, diphenylstyryls, triazines, benzoxazoles, bis(benzoxazoles), bis(benzoxazolyl)thiophenes, bis(benzoxazolyl)naphthalenes, pyrenes, coumarins or naphthalene-peridicarboximides.

The UV absorbers are practically sparingly water-soluble or water-insoluble derivatives of the benzophenone series, of 2-hydroxyphenyl-s-triazines or, preferably, of the 2-phenylbenzotriazole series. Particularly preferred UV absorbers are benzotriazoles of formula

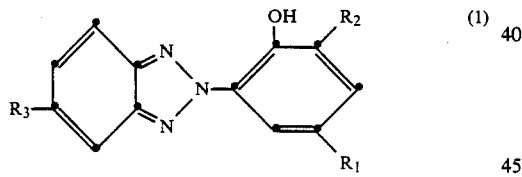

wherein $R_1$ is halogen, lower alkyl or lower alkoxy, and $R_2$ and $R_3$ are each independently of the other hydrogen, halogen, lower alkyl or lower alkoxy.

Among the benzotriazoles of formula (1), those compounds are preferred in which $R_1$ is lower alkyl such as methyl or tert-butyl, $R_2$ is hydrogen or lower alkyl, and $R_3$ is hydrogen, chloro or methyl.

Preferred individual compounds are: 2-(2'-hydroxy-5'-methylphenyl)benzotriazole, 2-(2'-hydroxy-3',5'-dimethylphenyl)benzotriazole, 2-(2'-hydroxy-5-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-tert-octylphenyl)-benzotriazole, 2-(2'-hydroxy-3',5'-di-tert-amylphenyl)benzotriazole or 2-(2'-hydroxy-3',5'-di-tert-butylphenyl)benzotriazole.

Examples of suitable dispersing agents are the known anionic dispersing agents such as lignosulfonates, condensates of naphthalenesulfonic acid and/or naphtholsulfonic acid or naphthylaminesulfonic acid with formaldehyde, condensates of phenolsulfonic acids and/or phenols with formaldehyde and urea.

Suitable dispersing agents are:

condensates of naphthalenesulfonic acid and formaldehyde, condensates of sulphonic acid groups containing mononuclear phenols and formaldehyde, condensates of binuclear, non-condensed mono- or bifunctional phenols and formaldehyde, condensates of not sulphonic acid groups containing mononuclear phenols, formaldehyde and sulfite, condensates of phenols, napthosulfonic acids, sodium sulfite and formaldehyde, in particular of cresol, 2-naphthol-6-sulfonic acid, sodium sulfite and formaldehyde.

Particularly suitable dispersing agents are also sulfonated condensates that have been obtained by reaction of an aromatic compound containing at least two replaceable nuclear hydrogen atoms, in any order, with a compound of formula

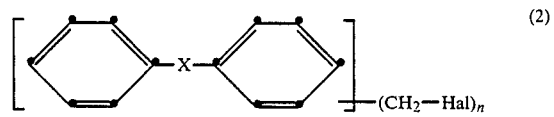

wherein X is a direct bond or oxygen, Hal is chloro or bromo, and n is 1 to 4, and sulfonation of the condensate.

These sulfonated condensates preferably have the formula

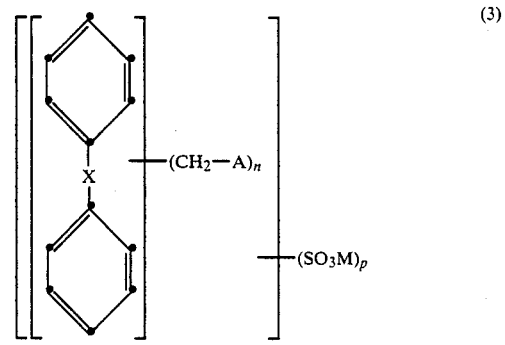

wherein X is a direct bond or oxygen, A is the radical of an aromatic compound which is attached through a ring carbon atom to the methylene group, M is hydrogen or a cation, for example in alkali metal cation, an alkaline earth metal cation or an ammonium group, and each of n and p is an integer from 1 to 4. Preferably n and p are 1 or 2 or they may also be any fraction from 1 to 4, for example 1.4, 1.8, 2.1 or 3.2.

Preferred starting materials of formula (2) are chloromethyldiphenyl and chloromethyldiphenyl ether. These compounds are usually mixtures of isomers containing 1 to 3 chloromethyl groups, which groups for example the chloromethyl groups are preferably in ortho- or para-position of the two benzene rings. The corresponding sulfonated condensates are thus also usually present in the form of mixtures, especially of mono- to trisubstituted diphenyl or diphenyl ether compounds. Depending on the starting materials and the chosen reaction conditions for the preparation of the condensates, the ratio of the isomers to one another will vary. If n is 1, p-isomers are obtained in amounts of, for example, 30 to 90%, and o-isomers in amounts of, for example, 70 to 10%. If n is 2, p,p'-, o,o'- or o,p'-compounds are obtained.

These sulfonated condensates and the preparation thereof are disclosed in German Offenlegungsschrift No. 2 353 691. Further particulars will be found in this reference.

The dispersing agents can be used in pure form, in technical mixtures or as a mixture of different components.

A representative example of a mixture of different components is the convenient concurrent use of 3 to 30% by weight, based on the dispersant mixture, of the cited sulfonated condensates of formula (3) in admixture with ligninsulfonates and condensates of naphthalenesulfonic acid and formaldehyde. The weight ratio of the ligninsulfonates to the formaldehyde/sulfonaphthalene condensates in the mixture is practically 10:1 to 3:1, preferably 6:1 to 4:1.

Dispersing agents which may also be suitably used are sulfated or phosphated polyadducts of 15 to 100 mol of ethylene oxide or, preferably, propylene oxide, with polyhydric $C_2$-$C_6$ aliphatic alcohols such as ethylene glycol, glycerol or pentaerythritol, or amines with 2 to 9 carbon atoms containing at least two amino groups or one amino group and one hydroxyl group, as well as alkylsulfonates containing preferably 10 to 20 carbon atoms in the alkyl chain, alkylbenzenesulfonates with straight or branched alkyl chain containing preferably 8 to 20 carbon atoms in the alkyl chain, for example nonylbenzenesulfonate or dodecylbenzenesulfonate, 1,3,5,7-tetramethyloctylbenzenesulfonate or octadecylbenzenesulfonate, as well as alkylnaphthalenesulfonates or sulfosuccinic acid esters, for example sodium dihexylsulfosuccinate or sodium dioctylsulfosuccinate.

A suitable component (c) is preferably an alkylenediamide of formula

R'—CO—NH—Q—NH—CO—R"      (4)

wherein R' and R" are each independently of the other an aliphatic radical of 9 to 23 carbon atoms and Q is an alkylene radical of 1 to 8, preferably 1, 2 or 3, carbon atoms.

Component (c) may be in the form of an individual compound or of a mixture of compounds.

The aliphatic radicals R' and R" may be in straight-chain or branched-chain configuration. Together with the —CO group they are preferably the acid radical of an unsaturated, or preferably saturated, aliphatic carboxylic acid of 10 to 24 carbon atoms. Typical aliphatic carboxylic acids are capric acid, lauric acid, coconut fatty acid, myristic acid, palm nut fatty acid, palmitic acid, tallow fatty acid, oleic acid, ricinolic acid, linoleic acid, linolenic acid, stearic acid, arachidic acid, arachidonic acid, behenic acid, erucic acid or lignoceric acid. Behenic acid and, more particularly, stearic acid are preferred.

It is also possible to use the mixtures of these acids obtained by cracking of natural oils or fats. Coconut fatty acid, palm nut fatty acid, palmitic acid/stearic acid mixtures, tallow fatty acid and arachidic acid/behenic acid mixtures are especially preferred mixtures.

R' and R" are preferably a $C_9$-$C_{23}$ alkyl radical and, most preferably, a $C_{15}$-$C_{21}$ alkyl radical.

Q is preferably a $C_2$-$C_5$ alkylene group which may be in straight-chain or branched-chain configuration and is, for example, the —CH$_2$CH$_2$—, —CH$_2$CH$_2$CH$_2$—,

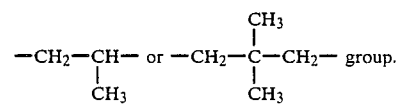

Typical representatives of component (c) are methylene bis(stearamide), ethylene bis(stearamide) or ethylene bis(behenamide).

The composition according to this invention conveniently comprises at least 1.5% by weight of component (c), based on the mixture of components (a)+(b)+(c). Preferably, however, the composition will contain 2 to 5% by weight of component (c) in order to obtain a stable and perceptibly low-foaming composition.

Depending on the component (a) employed, the composition according to the invention may contain, in addition to components (a), (b) and (c), alkali metal carbonates such as anhydrous sodium or potassium carbonate, electrolytes such as sodium chloride or sodium sulfate, sodium dithionite, emulsifying agents, glycols, block polymers and further foam inhibitors, for example $C_8$-$C_{22}$ fatty alcohols, $C_8$-$C_{22}$ fatty acids or salts thereof, or polypropylene glycols. The composition may contain up to about 25% by weight, but preferably not more than 15% by weight, of these additives. The composition may also contain up to 10% by weight of water as residual moisture.

Preferred compositions comprise, based on the entire composition, 20 to 40% by weight of component (a),
50 to 70% by weight of component (b) by itself or as a mixture of two or three dispersing agents,
1 to 5% by weight of component (c),
3 to 8% by weight of water, and
0 to 15% by weight of additional components.

The composition conveniently comprises the alkylenediamide (component (c)) in microdispersed form. The alkylenediamide is dispersed in known manner by the action of high shearing forces on component (a) in the presence of the dispersing agent, for example by kneading in a kneader or by grinding an aqueous suspension in a ball, sand or bead mill. The kneading stock or aqueous dispersion so obtained is dried in known manner, for example in drying cabinets, or by spray drying. An other means of using the alkylenediamide consists in first wet grinding the alkylenediamide with a dispersing agent and adding the resultant aqueous dispersion direct or after spray drying to the liquid or pulverized composition which preferably contains a dye as component (a).

Depending on component (a), the composition according to the invention is used for dyeing or optical brightening synthetic fibers, especially textile material containing polyester fibres and/or cellulose fibres. The polyester fibre material is, for example, cellulose ester fibres such as cellulose 2½ acetate and triacetate fibres and, in particular, linear polyester fibres. By linear polyester fibres are meant synthetic fibres which for example are obtained by condensation of terephthalic acid with ethylene glycol or of isophthalic acid or terephthalic acid with 1,4-bis(hydroxymethyl)cyclohexane, as well as copolymers or terephthalic acid or isophthalic acid and ethylene glycol. The linear polyester used hitherto almost exclusively in the textile industry consists of terephthalic acid and ethylene glycol. The dyeing or optical brightening process is carried out in conventional manner. The composition is slowly added to a presharpened aqueous bath, with stirring, after which the liquor for dyeing or optical brightening is prepared. Dispersions of UV absorbers may also be used as auxiliaries for dyeing synthetic fibres, especially polyester fibres or also acid-modified polyester fibres.

It is already known to add foams inhibitors to the compositions. The prior art foam inhibitors added to commercial formulations for foam stabilizing are only partially effective or cannot be homogenised therein, so that, for example, specky and unlevel dyeings are obtained. Surprisingly, however, exhaust and pad dyeing can be carried out substantially low foaming using the compositions according to the invention.

In the following Examples, parts and percentages are by weight, unless otherwise stated.

EXAMPLE 1

A dye composition formulated from 318 parts of a disperse dye of formula

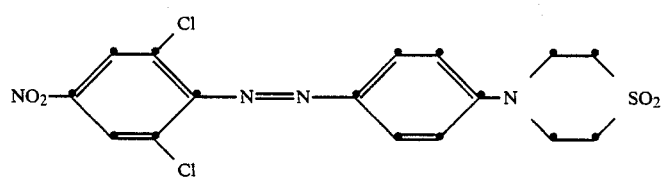

422 parts of ligninsulfonate,
100 parts of condensate of formaldehyde and the sodium salt of naphthalenesulfonic acid,
100 parts of the biphenylmethylnaphthalenesulfonic acid prepared according to Example 3 of German Offenlegungsschrift No. 2 353 691, as sodium salt,
30 parts of N,N'-ethylenebis(stearamide), and
60 parts of water as residual moisture is obtained by wet grinding all components in an open ball mill to an average particle size of 1–2 μm and subsequently spray drying the aqueous dispersion.

0.6 g of the powder so obtained is dispersed in 250 ml of deionised water. When subjected to a foam test by the Pretema Jet method, this dispersion does not foam at 30°, 60° and 120° C. The following results are obtained by preparing a composition by the same method, not containing N,N'-ethylene bis(stearamide), and subjecting a dispersion of 0.6 g of the powder so obtained in 250 ml of water to the foam test:
foam height 100 mm at 30° C.
foam height 100 mm at 60° C.
foam height 100 mm at 120° C.

EXAMPLE 2

(a) A dye composition formulated from
264 parts of a disperse dye of formula

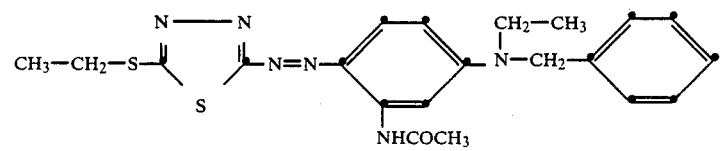

450 parts of ligninsulfonate,
100 parts of a condensate of formaldehyde and the sodium salt of naphthalenesulfonic acid,
120 parts of biphenylmethylnaphthalenesulfonic acid prepared according to Example 3 of German Offenlegungsschrift No. 2 353 691 as sodium salt,
6 parts of a propylene oxide/ethylene oxide block polymer (mol. wt. 300), and
60 parts of water as residual moisture is obtained by wet grinding all components in an open ball mill to an average particle size of 1–2 μm and subsequently spray drying the aqueous dispersion.

(b) To the powder prepared according to (a) are added 37 parts of a composition comprising
570 parts of N,N-ethylenebis(stearamide),
380 parts of a condensate of formaldehyde and the sodium salt of naphthalene sulfonic acid, and
50 parts of water and obtained by wet grinding the components in an open ball mill to an average particle size of 1–2 μm and subsequently spray drying the aqueous dispersion.

0.6 g of this powder is dispersed in 250 ml of deionised water. When this dispersion is subjected to a foam test by the Pretema Jet method, the results are as follows:

| foam height | 10 mm at 30° C. |
|---|---|
| | 0 mm at 60° C. |
| | 0 mm at 120° C. |

By subjecting a dispersion of 0.6 g of the powder obtained according to (a) to the foam test, the results are as follows:

| foam height | 100 mm at 30° C. |
|---|---|
| | 100 mm at 60° C. |
| | 50 mm at 120° C. |

EXAMPLE 3

(a) A dye composition formulated from 510 parts of a disperse dye of formula

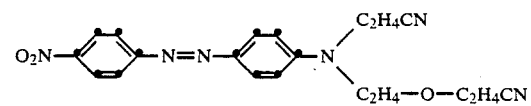

440 parts of a ligninsulfonate,
40 parts of a composition comprising 500 parts of N,N'-ethylene bis(stearamide), 120 parts of a condensate of formaldehyde and the sodium salt of naphthalenesulfonic acid, 330 parts of a ligninsulfonate and 50 parts of water (residual moisture), 20 parts of a propylene oxide/ethylene oxide block polymer (mol. wt. 3000), and 48 parts of water (residual moisture)

is obtained by wet grinding the components in an open ball mill to an average particle size of 1-2 μm and subsequently spray drying the aqueous dispersion.

0.6 g of this powder is dispersed in 250 ml of deionised water. When this dispersion is subjected to a foam test by the Pretema Jet method, the results are as follows:

| foam height | 20 mm at 30° C. |
|---|---|
| | 10 mm at 60° C. |
| | 0 mm at 120° C. |

(b) The following results are obtained by preparing a composition by the same method, but without containing N,N'-ethylene bis(stearamide), and subjecting a dispersion of 0.6 g of the powder so obtained in 250 ml of deionised water to the foam test:

| foam height | 95 mm at 30° C. |
|---|---|
| | 100 mm at 60° C. |
| | 70 mm at 120° C. |

EXAMPLE 4

The following components are mixed in a sand mill:
40 parts of 2-(2'-hydroxy-3'-tert-butyl-5'-methylphenyl)-5-chlorobenzotriazole, 10 parts of the ammonium salt of sulfuric acid ester of the addition produced of 60 ml of propylene oxide and 1 mol of glycerol, 1 part of an oxalkylated $C_{16}$-$C_{18}$ alcohol containing 25 ethylene oxide units, 3 parts of N',N'-ethylene bis(stearamide), and 46 parts of water.

The mixture is then ground with quartz sand until the particle size is <5 μm. The dispersion is separated from the sand.

With stirring, 75 parts of the resultant dispersion are mixed with 12.5 parts of a 2% aqueous solution of a biopolymer based on polysaccharide, and 12.5 parts of water and homogenised.

EXAMPLE 5

The following components are mixed in a sand mill:
40 parts of a mixture of 1,2-bis(5-methylbenzoxazol-2-yl)ethylene and 2,4-dimethoxy-6-(1-pyrenyl)-1,3,5-triazine, 2 parts of sodium dihexylsulfosuccinate, 4 parts of a polyadduct of 80% of ethylene oxide and 20% of propylene oxide (mol. wt. ca. 10,000 to 15,000), 4 parts of N', N'-ethylene bis(stearamide), and 40 parts of water.

The mixture is then ground with quartz sand until the particle size is <3 μm. The dispersion is separated from the sand.

With stirring, 50 parts of the resultant dispersion are mixed with 15 parts of a 10% solution of a polyvinyl alcohol, 0.5 parts of formaldehyde, and 34.5 parts of water, and homogenised.

EXAMPLES FOR THE APPLICATION

EXAMPLE 1

100 parts of the composition prepared according to Example 1 are dispersed in 900 parts of water. A polyester/cotton fabric is padded with this non-foaming liquor to a pick-up of 70% and the fabric is then given an intermediate drying and subjected to a thermosol treatment for 1 minute at 210° C. A level, yellow, non-specky dyeing is obtained.

EXAMPLE 2

100 g of a polyester knitted fabric (polyethylene glycol terephthalate) are put at 60° C. into a HT circulation dyeing machine containing 3 liters of water and 9 g of ammonium sulfate, 18 g of the disodium salt of bis(6-sulfonaphth-2-yl)-methane, 5 g of a finely dispersed dye of formula

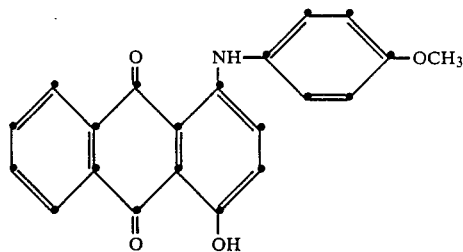

and 3 g of the UV absorber formulation prepared according to Example 4. This dyebath is adjusted with 85% formic acid to pH 5. The dyebath is heated, with constant circulation of the liquor, to 130° C. over 30 minutes, and dyeing is carried out for 1 hour at this temperature. The dyebath is then cooled and the substrate is rinsed and given a customary reductive purification to remove non-fixed dye. The substrate is then neutralised, rinsed once more and dried. Owing to the stable UV absorber formulation concurrently employed, neither a rise in the differential pressure during the dyeing procedure is observed, nor are any deposits formed in the interior of the cheese. A level, lightfast navy blue dyeing is thus obtained.

What is claimed is:

1. A composition for finishing synthetic fiber which comprises, based on (a)+(b)+(c),
   (a) 15 to 84% by weight of a sparingly water-soluble or water-insoluble dye, fluorescent whitening agent or UV absorber,
   (b) 15.5% to 75% by weight of one or more dispersing agents, and
   (c) 0.5% to 10% by weight of an aklylenediamide of formula R'—CO—NH—Q—NH—CO—R" (4) wherein R' an R" are each independently of the other an aliphatic radical of 9 to 23 carbon atoms and Q is an alkylene radical of 1 to 8 carbon atoms;
in the substantial absence of silicone and hydrocarbon oils.

2. A composition according to claim 1, wherein the dye is a disperse dye.

3. A composition according to claim 1, wherein the fluorescent whitening agent is selected from the class of the stilbenes, distyrylbenzenes, disphenylstyryls, triazines, benzoxazoles, bis(benzoxazoles), bis(benzoxazolyl)thiophenes, bis(benzoxazolyl)naphthalenes, pyrenes, coumarins or naphthalene-peridicarboximides.

4. A composition according to claim 1, wherein the UV absorber is a sparingly water-soluble or water-insoluble derivative of the benzophenone series, of 2-hydroxyphenyl-s-triazines, or of the 2-phenylbenzotriazole series.

5. A composition according to claim 4, wherein the UV absorber is a compound of the formula

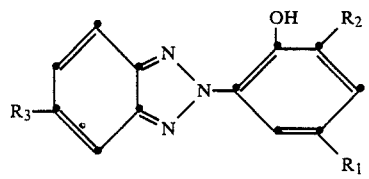

wherein $R_1$ is halogen, lower alkyl or lower alkoxy, and $R_2$ and $R_3$ are each independently of the lower hydrogen, halogen, lower alkyl or lower alkoxy.

6. A composition according to claim 1, wherein the dispersing agent (b) is selected from the group consisting of ligninsulfonates, condensates of naphthalenesulfonic acid or naphtholsulfonic acid or naphthylaminesulfonic acid with formaldehyde, or condensates of phenolsulfonic acids or phenols with formaldehyde and urea.

7. A composition according to claim 6, wherein the dispersing agent is a sulfonated condensate which has been obtained by reaction of an aromatic compound containing at least two replaceable nuclear hydrogen atoms, in any order, with a compound of formula

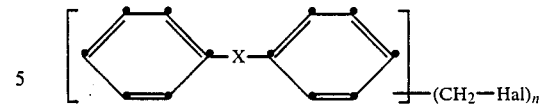

wherein X is a direct bond or hydrogen, Hal is chloro or bromo, and n is 1 to 4, and sulfonation of the condensate.

8. A composition according to claim 7, wherein the sulfonated condensate has been obtained by using a mononuclear or polynuclear aromatic hydrocarbon which is unsubstituted or substituted by hydroxy, $C_1$–$C_4$ alkyl group, $C_1$–$C_4$ alkoxy groups or halogen, and which contains at least two replaceable nuclear hydrogen atoms.

9. A composition according to claim 8, wherein the sulfonated condensate has been obtained by using a naphthalene compound which is unsubstituted or substituted by hydroxy, chloro or methyl, and which contains at least two replaceable nuclear hydrogen atoms.

10. A composition according to claim 1, wherein the dispersing agent is a mixture of ligninsulfonates, condensates of naphthalenesulfonic acid and formaldehyde and sulfonated condensates as claimed in claim 7.

11. A composition according to claim 1, wherein the dispersing agent is a sulfated or phosphated polyadduct of alkylene oxide with polyhydric $C_2$–$C_6$ aliphatic alcohols or $C_2$–$C_9$ amines containing at least two amino groups or one amino group and one hydroxyl group.

12. A composition according to claim 1, wherein the dispersing agents are alkylsulfonates, alkylnaphthalenesulfonates or sulfosuccinic acid esters.

13. A process for the preparation of a composition according to claim 1, which comprises grinding the dye, the fluorescent whitening agent of the UV absorber of component (a), the dispersant (b) and the alkylenediamide (c) in the form of an aqueous dispersion, and drying the aqueous dispersion so obtained.

14. A process for dyeing or whitening synthetic fiber, which comprises the use of a composition as claimed in claim 1.

15. A process of claim 14 wherein the synthetic fiber comprises polyester fibers.

* * * * *